United States Patent
Leone et al.

(10) Patent No.: US 9,347,519 B2
(45) Date of Patent: May 24, 2016

(54) STRAP MOUNTING FOR PENDULUM DAMPERS

(71) Applicant: Ford Global Technologies, LLC, Dearborn, MI (US)

(72) Inventors: Thomas G. Leone, Ypsilanti, MI (US); Alvin H. Berger, Brownstown Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 14/076,922

(22) Filed: Nov. 11, 2013

(65) Prior Publication Data

US 2015/0128758 A1 May 14, 2015

(51) Int. Cl.
*F16F 15/14* (2006.01)

(52) U.S. Cl.
CPC ........... *F16F 15/145* (2013.01); *Y10T 74/2128* (2015.01); *Y10T 74/2132* (2015.01)

(58) Field of Classification Search
CPC ......... F16F 15/28; F16F 15/31; F16F 15/315; F16F 15/145
USPC ...................................................... 74/574.2
See application file for complete search history.

(56) References Cited

U.S. PATENT DOCUMENTS

| 1,982,394 | A | * | 11/1934 | Morris | F16H 37/124 |
| | | | | | 192/139 |
| 2,378,592 | A | * | 6/1945 | Specht | 74/604 |
| 4,739,679 | A | * | 4/1988 | Berger et al. | 74/574.3 |
| 6,010,408 | A | * | 1/2000 | Mueller et al. | 464/77 |
| 6,062,180 | A | * | 5/2000 | Carlback | 123/73 R |
| 6,418,902 | B1 | * | 7/2002 | Ericson | 123/192.2 |
| 2012/0031226 | A1 | | 2/2012 | Jung | |

FOREIGN PATENT DOCUMENTS

| DE | 1466911 A1 | * | 6/1969 | ............ A61B 6/105 |
| DE | 102009053482 A1 | | 9/2010 | |
| DE | 102012211216 A1 | | 1/2013 | |
| WO | 2012083920 A1 | | 6/2012 | |

* cited by examiner

*Primary Examiner* — Vicky Johnson

(57) ABSTRACT

A pendulum damper fixed to a rotating element of an engine comprises a pendulum anchor, a pendulum, and a flexible metal strap attaching the pendulum and pendulum anchor. The strap is wound around the pendulum and pendulum anchor to define a bifilar pendulum. A pendulum clamp is attached to the pendulum such that part of the strap is captured between the pendulum clamp and the pendulum. A pendulum anchor clamp is attached to the pendulum anchor such that a portion of the strap is captured between the pendulum anchor clamp and the pendulum anchor. The pendulum includes a pendulum anchor-facing, flexible strap-supporting cam surface. The pendulum anchor includes a pendulum-facing, flexible strap-supporting cam surface. The surfaces of the pendulum and the pendulum anchor that face each other are mutually conjugant so that at all positions of normal pendulum motion there is only a small running clearance between the two surfaces.

15 Claims, 3 Drawing Sheets

STRAP MOUNTING FOR PENDULUM DAMPERS

TECHNICAL FIELD

The disclosed inventive concept relates generally to dampers to reduce torsional vibration in an internal combustion engine. More particularly, the disclosed inventive concept relates to pendulum dampers mounted by straps to the engine flywheel.

BACKGROUND OF THE INVENTION

Torsional vibration in the internal combustion engine is a well-known problem. This vibration is the consequence of a variation in the crankshaft speed of rotation, driven by fluctuations in the delivery of torque from the pistons to the crankshaft. The firing frequency of the engine is usually the largest constituent of the crankshaft torsional vibration.

One response to torsional vibration in the internal combustion engine has been the provision of vibration dampers. A common choice of vibration damper is the pendulum damper. This type of damper has been used in aircraft engines and, more recently, has been used in the torque converters of production automotive engines. The pendulum damper is thus well known for suppressing engine vibrations. This suppression is accomplished by tuning the pendulum to resonate at the engine firing frequency. In particular, pendulum dampers have been employed to balance or cancel out undesirable order vibrations of an engine. In these cases, the crankshaft is connected to the pendulum mass by rollers that in different ones of the references move in circular, cycloidal, or other paths in an attempt to keep the pendulums' resonant frequency in accordance with the engine's firing frequency at all engine speeds.

Known pendulum dampers are designed to prevent mechanical damage to the engine by preventing swing amplitudes of the pendulum masses beyond their mechanical limits or capacity. In these known dampers the pendulum masses at low amplitude swing angles almost completely cancel engine vibrations by tracking of the rollers along a path which generates approximately tautochronic motion of the pendulums. At higher or greater amplitudes, these arrangements provide a method of automatically detuning the pendulums whereby they progressively become less and less tuned to the excitation frequency of the crankshaft. This results in a progressive decrease in the response of the pendulum to the vibrational impulses, which limits the swing amplitude at higher torsional vibration excitation levels to maintain the pendulum mass within the mechanical limits of its swing angle capacity.

While pendulum dampers have proven effective at reducing torsional vibration in the internal combustion engine, known pendulum dampers do not provide a perfect solution to the vibration problem. Of particular concern is the fact that the placement of the rollers is generally limited to lubricated environments. However, placement of the rollers in a non-lubricated environment such as on the flywheel of a dry clutch may result in early failure and thus raises durability concerns.

As in so many areas of vehicle technology, there is always room for improvement related to the systems and methods to reduce the amount of torsional vibration produced by the internal combustion engine.

SUMMARY OF THE INVENTION

The disclosed inventive concept overcomes the problems associated with known approaches to reducing torsional vibrations generated in operating internal combustion engines. The disclosed inventive concept accomplishes this step by providing a pendulum damper for an internal combustion engine. The damper is fixed to a rotating element such as the engine's flywheel.

The pendulum damper of the disclosed inventive concept includes a pendulum having first and second ends and a pendulum anchor fixedly attached to the rotating element. The pendulum anchor also has first and second ends.

A flexible strap is wound around the pendulum and the pendulum anchor such that the strap connects the first end of the pendulum to the first end of the pendulum anchor and connects the second end of the pendulum to the second end of the pendulum anchor. The strap is composed of any of a variety of flexible materials appropriate for such an application, including stainless steel. Preferably, the flexible strap is formed from a plurality of layered straps. This arrangement defines a bifilar pendulum damper.

A pendulum clamp is attached to the pendulum by mechanical fasteners such that a portion of the flexible strap is captured between the pendulum clamp and the pendulum. In the same manner, a pendulum anchor clamp is attached to the pendulum anchor by mechanical fasteners such that a portion of the flexible strap is captured between the pendulum anchor clamp and the pendulum anchor.

The pendulum includes a pendulum anchor-facing surface having active regions that define flexible strap-supporting cam surfaces. In the same way, the pendulum anchor includes a pendulum-facing surface having active regions that define flexible strap-supporting cam surfaces.

The disclosed pendulum damper may be tuned to reduce torsional vibrations of different orders by adjusting the cam surface configurations to change the lengths of the actively flexing portions of the flexible strap. The pendulum damper disclosed herein may be used in a non-lubricated environment. Thus the disclosed pendulum damper offers several advantages over known roller systems by providing better durability and a reduction in material, manufacturing and assembly costs.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
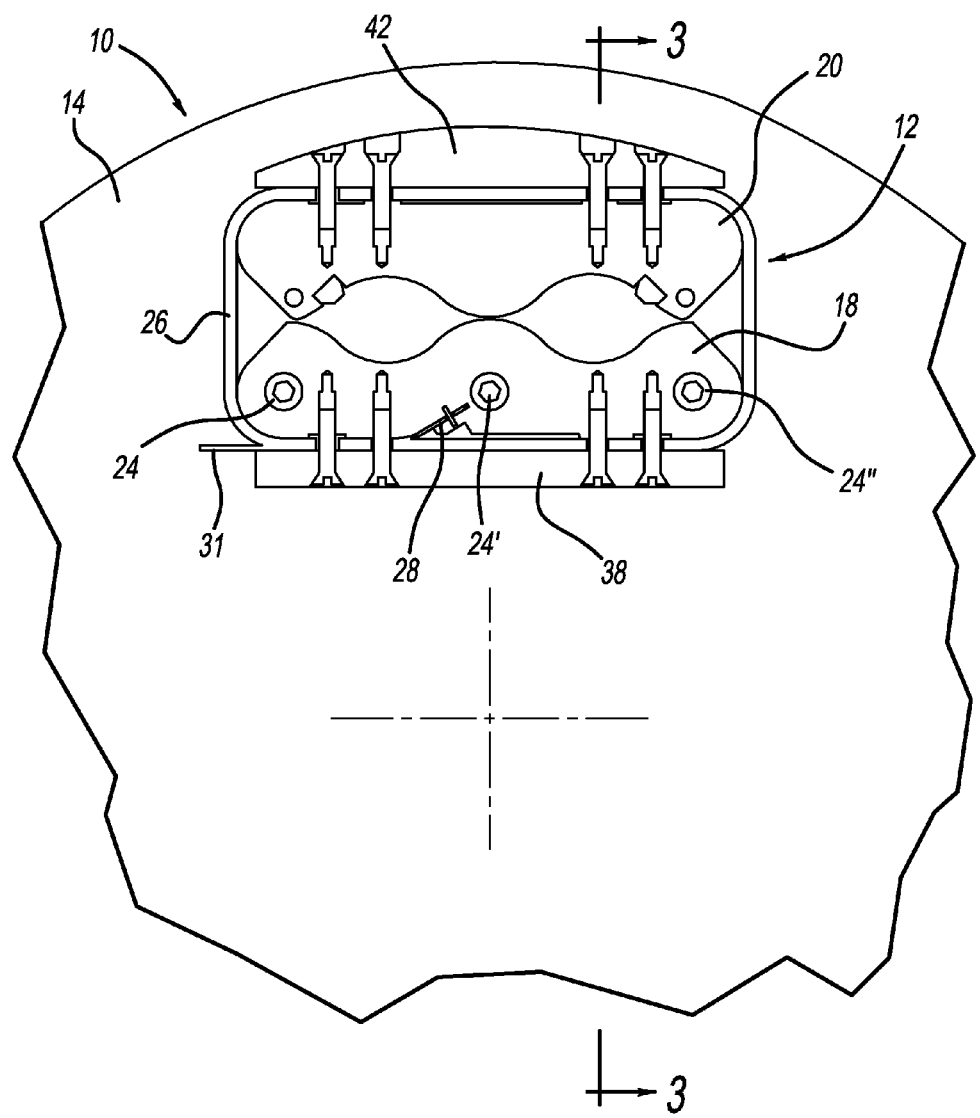
FIG. 1 is an end view of a bifilar pendulum damper constructed according to the disclosed inventive concept assembled to an engine flywheel.

In the following figures, the same reference numerals will be used to refer to the same components. In the following description, various operating parameters and components are described for different constructed embodiments. These specific parameters and components are included as examples and are not meant to be limiting.

Figure 2:
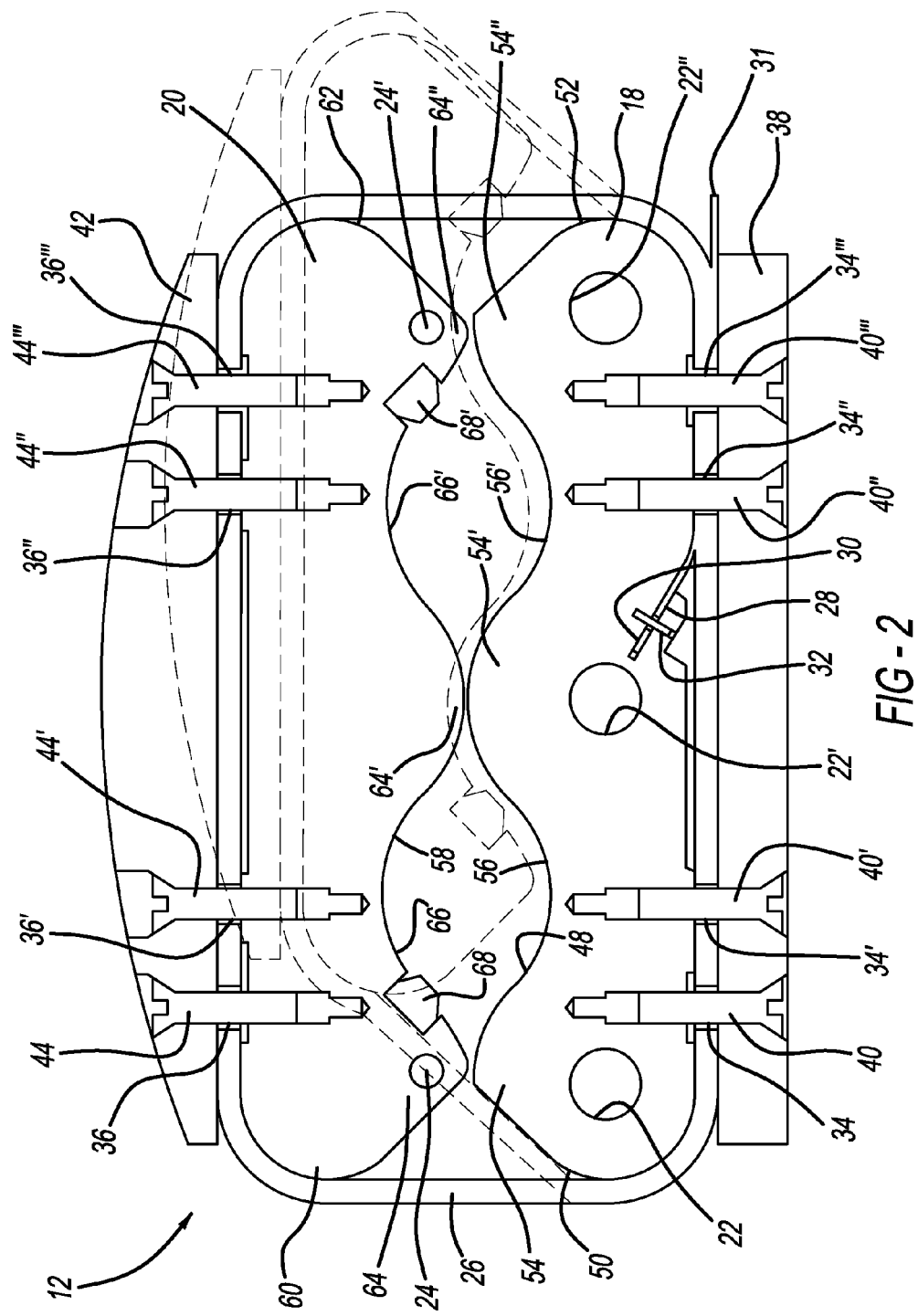
FIG. 2 is an enlarged view of the bifilar pendulum damper shown in FIG. 1.

An assembly for dampening torsional vibration according to the disclosed inventive concept, generally illustrated as 10, is shown in FIG. 1, which illustrates an end view of the assembly 10, and FIG. 2, which illustrates an enlarged view of the assembly 10. The assembly 10 includes at least one bifilar pendulum damper assembly 12 fastened to an automotive engine flywheel 14 with the engine flywheel having an axial direction 16 (shown in FIG. 3). The bifilar pendulum damper assembly 12 is shown in greater detail in FIG. 2.

It is to be understood that while a single bifilar pendulum damper assembly 12 is shown attached to the engine flywheel 14, preferably four such assemblies would be attached to the engine flywheel 14, although other numbers of assemblies such as three and five may be possible depending on the number of engine cylinders and other variables. By way of preferred example, by placing one bifilar pendulum damper assembly 12 on each quadrant of the engine flywheel 14, a tuning order of 1.5 could be achieved to correspond to the firing frequency of a three cylinder engine.

The bifilar pendulum damper assembly 12 basically comprises a fixed portion and a movable portion. The fixed portion is a pendulum anchor 18 while the movable portion is a pendulum 20. The pendulum anchor 18 is fixedly attached to the engine flywheel 14. A plurality of mounting bores 22, 22,' and 22" is formed in the pendulum anchor 18 although a greater or lesser number of bores may be formed. A like number of fasteners (fasteners 24, 24', and 24", shown in FIG. 1) fix the pendulum anchor 18 to the engine flywheel 14. Attachment of the pendulum anchor 18 to the engine flywheel 14 may be controlled by use of dowels or similar location tools to more precisely control the actual location of the pendulum anchor 18 relative to the engine flywheel 14.

The pendulum 20 is attached to the pendulum anchor 18 by a flexible strap 26. The flexible strap 26 may be formed from any of a variety of suitable materials which may include, but not be limited to, stainless steel shim stock. The shim stock would preferably be wound in multiple layers to form the flexible strap 26 thereby achieving the desired tensile strength. The shim stock forming the flexible strap 26 may be of any suitable thickness but in any event must be thin enough so that it does not undergo excessive bending stress from wrapping and flexing during engine operation.

The flexible strap 26 includes two free ends including a first end 28 that is slotted into a saw cut 30 formed in the pendulum anchor 18. A pin or set screw 32 anchors the end 28 within the saw cut 30. On assembly, once the end 28 of the flexible strap 26 is positioned within the saw cut 30 and the pin or set screw 32 is adjusted so as to hold the end 28 in place, the flexible strap 26 is then wrapped around the pendulum anchor 18 and the pendulum 20 multiple times until the desired number of wraps (and thus the desired tensile strength) is achieved. The pendulum 20 and the pendulum anchor 18 may be held in place relative to each other during the wrapping of the flexible strap 26 by mounting both pieces in a fixture that precisely locates and holds the pieces by engaging dowels or other fasteners into holes 22, 22', and 22" in the pendulum anchor 18 and holes 24 and 24' in the pendulum 20.

Once the flexible strap 26 has been wrapped as desired, it is held in tension while fastener holes are formed through an appropriate process that would not result in excessive weakening of the flexible strap 26 in the areas adjacent to the fastener holes. Particularly, fastener holes 34, 34', 34", and 34'" are formed through the area of the flexible strap 26 adjacent to the pendulum anchor 18 while fastener holes 36, 36', 36", and 36'" are formed through the area of the flexible strap 26 adjacent to the pendulum 20.

Following formation of the fastener holes 34, 34', 34", and 34'", a pendulum anchor clamp 38 is positioned so that fasteners 40, 40', 40", and 40'" are located through the fastener holes 34, 34', 34", and 34'" to thereby fasten the pendulum anchor clamp 38 to the pendulum anchor 18, capturing therebetween a portion of the flexible strap 26. Similarly, following formation of the fastener holes 36, 36', 36", and 36'", a pendulum clamp 42 is positioned so that fasteners 44, 44', 44", and 44'" are located through the fastener holes 36, 36', 36", and 36'" to thereby fasten the pendulum clamp 42 to the pendulum 20, capturing therebetween a portion of the flexible strap 26. Excess shim stock at the second end 31 would then be removed.

It should be noted that at the end holes 34, 34'", 36, and 36'" where the flexible strap 26 transitions from being clamped between the pendulum 20 and the pendulum clamp 42 and between the pendulum anchor 18 and the pendulum anchor clamp 38, material has been removed from the pendulum 20, the pendulum clamp 42, the pendulum anchor 18 and the pendulum anchor clamp 38 at the surfaces that mate the flexible strap 26 so that most of the clamping loads generated by the fasteners 40, 40'", 44, and 44'" are transferred to the portion of the flexible strap 26 located between the flexing portion between the pendulum 20 and the pendulum anchor 18 that has not been weakened by the formation of holes 34, 34'", 36, and 36'". The clamping load on these portions of the flexible strap 26 will generate friction between the flexible strap 26 and the pendulum 20, the pendulum clamp 42, the pendulum anchor 18, and the pendulum anchor clamp 38 so that the tensile load carried by the flexing portions of the flexible strap 26 will not be transferred to the portion of the flexible strap 26 that has been weakened by the formation of holes 34, 34'", 36, and 36'".

The pendulum anchor 18 includes an active region in the form of a pendulum-facing surface 48. A first shaped curve 50 forms a first cam surface while a second shaped curve 52 forms a second cam surface. The pendulum-facing surface 48 further includes a series of peaks 54, 54', and 54" and valleys 56 and 56'.

The pendulum 20 includes an active region in the form of a pendulum anchor-facing surface 58. A first shaped curve 60 forms a first cam surface while a second shaped curve 62 forms a second cam surface. The pendulum-facing surface 58 further includes a series of peaks 64, 64' and 64" and valleys 66 and 66'. Elastomeric bumpers 68 and 68' are provided adjacent the peaks 64 and 64" respectively. The elastomeric bumpers 68 and 68' are provided to reduce the impact of metal to metal contact between the pendulum anchor 18 and the pendulum at both ends of the swinging of the pendulum 20 relative to the pendulum anchor 18.

It is to be understood that the shapes of the pendulum-facing surface 48 of the pendulum anchor 18 and the pendulum anchor-facing surface 58 of the pendulum 20 are shown in suggested forms that are not intended as being limiting. Rather, the surface configurations are contoured such that the cam surfaces provide effective wrapping and unwrapping surfaces for the flexible strap 26, while the peaks and valleys of the pendulum 20 and the pendulum anchor 18 are configured to be mutually conjugant. At all positions of the pendulum's swing relative to the pendulum anchor 18 there is only a small running clearance between the surface 48 of the pendulum anchor 18 and the surface 58 of the pendulum 20. This conjugant relationship between the two surfaces ensures that the pendulum motion cannot deviate from its prescribed path, the flexible strap 26 will never see any compressive load that could distort it, and the pendulum 20 cannot impact against the pendulum anchor 18 at any location except at the elastomeric bumpers 68 and 68'. Specifically, and as shown in FIG. 1, the position of the pendulum 20 relative to the pendulum anchor 18 is shown at the middle of its allocated travel between the ends of the swing where the elastomeric bumpers 68 and 68' would make contact against the pendulum anchor 18.

Figure 3:
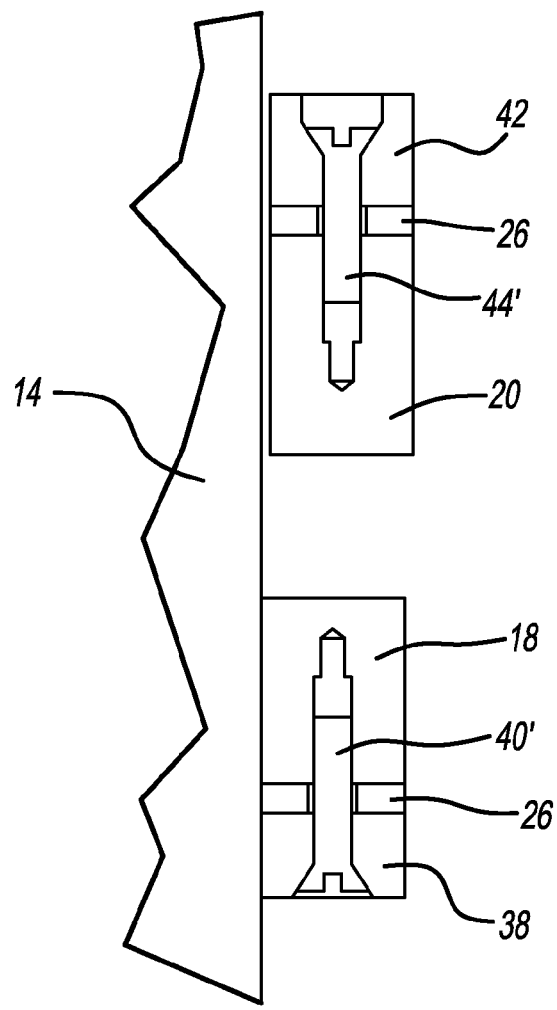
FIG. 3 is a cross-sectional view taken on a plane indicated by and viewed in the direction of line 3-3 of FIG. 1.

However, in operation, the pendulum 20 would swing to one side or the other relative to the pendulum anchor 18 as illustrated in broken lines in FIG. 3. By moving toward the right of center relative to the pendulum anchor 18 as depicted by the broken lines the flexible strap 26 has wrapped around the first shaped curve 50 of the pendulum anchor 18 and the second shaped curve 62 of the pendulum 20 while at the same time the flexible strap 26 has unwrapped around the second shaped curve 52 of the pendulum anchor 28 and the first shaped curve 60 of the pendulum 20.

Thus the cam surfaces are contoured so that the unwrapping end of the flexible strap 26 experiences a constant or a progressively decreasing radius while the wrapping end experiences a constant or a progressively increasing radius. In this way the lengths of the actively flexing strap 26 between the pendulum 20 and the pendulum anchor 18 remain constant or decrease as the angle of the swing of the pendulum 20 increases. This geometry will allow the pendulum resonance frequency at high amplitude to be forced sufficiently high so that the pendulum 20 will be less responsive to receiving additional energy from crankshaft vibration before the elastomeric bumpers 68 and 68' attached to pendulum anchor-facing surface 58 of the pendulum 20 come into contact with the pendulum-facing surface 48 of the pendulum anchor 18.

The bifilar pendulum damper assembly 12 of the disclosed inventive concept may be employed in a lubricant-free environment. However, this environment should be free from dirt or debris.

One skilled in the art will readily recognize from such discussion, and from the accompanying drawings and claims that various changes, modifications and variations can be made therein without departing from the true spirit and fair scope of the invention as defined by the following claims.

What is claimed is:

1. A vibrational damper for an internal combustion engine, the engine having a rotational element, the damper comprising:
    a pendulum having first and second ends and an anchor-facing surface;
    a pendulum anchor fixedly attached to the rotational element, said anchor having first and second ends and a pendulum-facing surface;
    a flexible strap connecting said first end of said pendulum to said first end of said pendulum anchor and connecting said second end of said pendulum to said second end of said pendulum anchor;
    a pendulum clamp fixed to said pendulum; and
    wherein at least one of said surfaces has a strap-supporting cam surface and whereby a portion of said strap is captured between said clamp and said anchor.

2. The vibrational damper of claim 1 wherein said flexible strap is composed of multiple layers of a flexible material.

3. The vibrational damper of claim 2 wherein said flexible material is a metal.

4. The vibrational damper of claim 3 wherein said metal is stainless steel.

5. The vibrational damper of claim 1 wherein said pendulum anchor includes an anchor clamp fixed to said anchor whereby a portion of said flexible strap is captured between said anchor clamp and said pendulum anchor.

6. The vibrational damper of claim 5 wherein said clamp includes a portion having fastener-passing holes and a portion that is free of fastener-passing holes.

7. The vibrational damper of claim 1 wherein said pendulum anchor-facing surface and said pendulum-facing surface each include a peak and a valley.

8. A vibrational damper assembly comprising:
    a rotational element;
    a first element having first and second ends and a clamp;
    a second element fixedly attached to said rotational element, said second element having first and second ends, said elements having strap-contacting cam surfaces;
    a flexible strap connecting said first end of said first element to said first end of said second element and connecting said second end of said first element to said second end of said second element, whereby a portion of said strap is captured between said clamp and said first element.

9. The vibrational damper assembly of claim 8 wherein said first element is a pendulum and said second element is a pendulum anchor.

10. The vibrational damper assembly of claim 9 wherein said flexible strap is composed of multiple layers of a flexible material.

11. The vibrational damper assembly of claim 9 wherein said pendulum anchor includes an anchor clamp fixed to said anchor whereby a portion of said flexible strap is captured between said anchor clamp and said pendulum anchor.

12. The vibrational damper assembly of claim 9 wherein said pendulum includes a pendulum anchor-facing surface and wherein said strap-contacting cam surface is defined by active regions formed on said pendulum anchor-facing surface.

13. The vibrational damper assembly of claim 9 wherein said pendulum anchor includes a pendulum-facing surface and wherein said strap-contacting cam surface is defined by active regions formed on said pendulum pendulum-facing surface.

14. A vibrational damper assembly comprising:
    a rotational element;
    a pendulum having first and second ends;
    a pendulum anchor fixedly attached to said rotational element, said anchor having first and second ends, said anchor including an anchor clamp fixed thereto;
    a single, multi-layered flexible strap wrapped around and connecting said first end of said pendulum to said first end of said anchor and connecting said second end of said pendulum to said second end of said anchor, a portion of said strap being captured between said clamp and said anchor, wherein said pendulum includes a pendulum clamp fixed to said pendulum whereby a portion of said flexible strap is captured between said pendulum clamp and said pendulum.

15. The vibrational damper assembly of claim 14 wherein said pendulum includes a pendulum anchor-facing surface and wherein said surface includes active regions that define flexible strap-supporting cam surfaces and wherein said pendulum anchor includes a pendulum-facing surface and wherein said surface includes active regions that define flexible strap-supporting cam surfaces.

* * * * *